Figure 1:
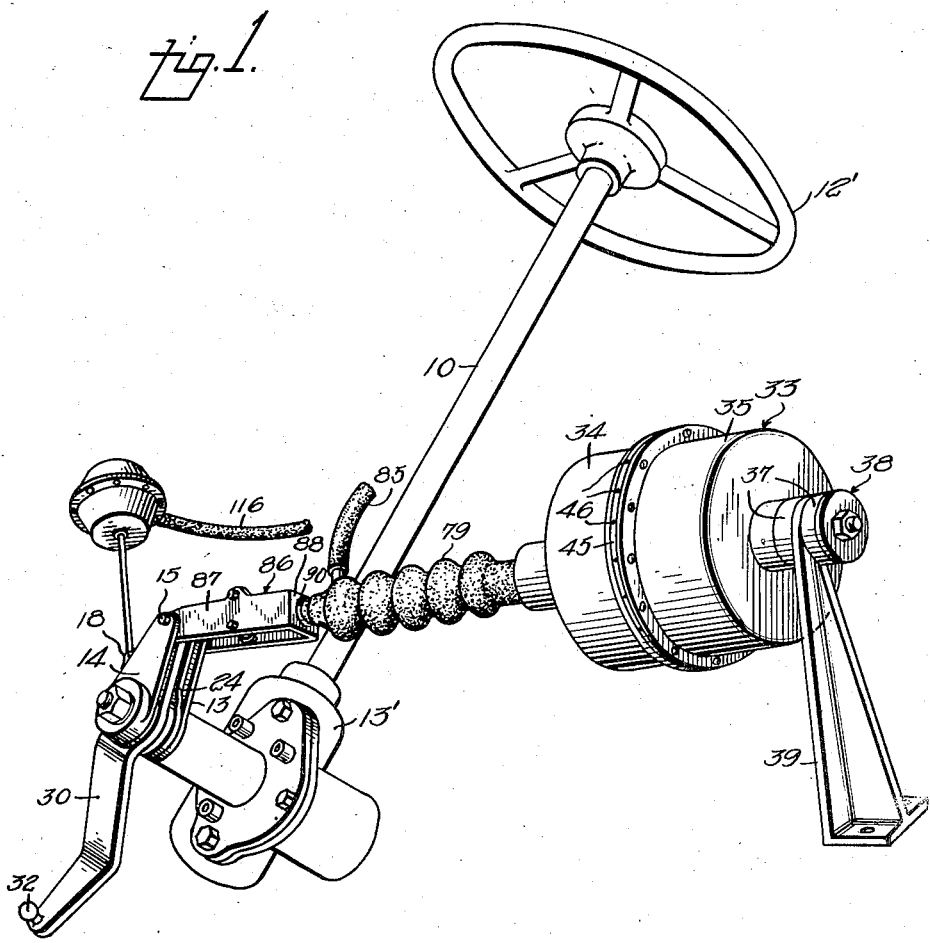

Feb. 8, 1944.  J. G. INGRES  2,341,502
POWER STEERING MECHANISM
Filed Sept. 26, 1941  3 Sheets-Sheet 1

Inventor
J. G. INGRES

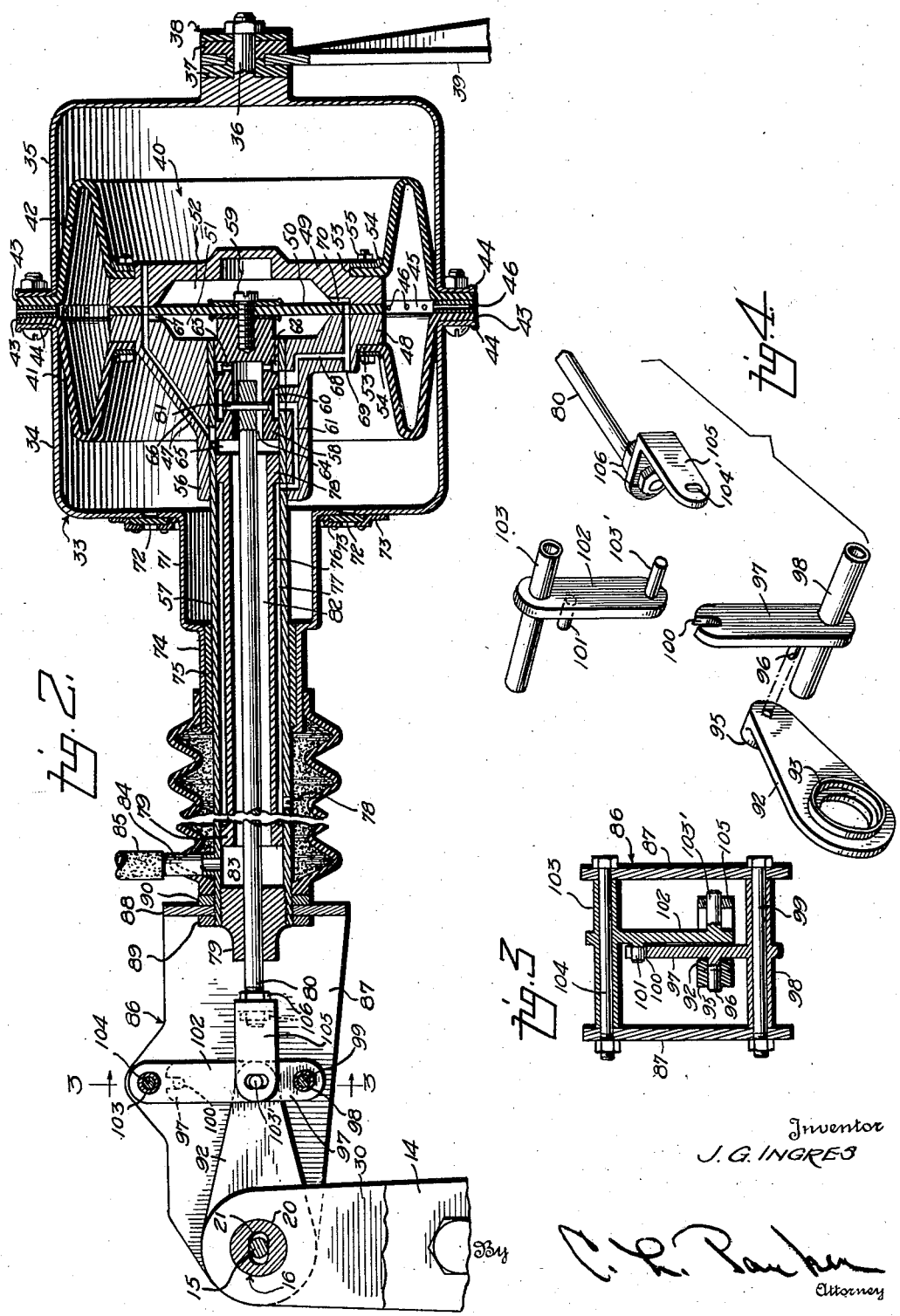

Feb. 8, 1944.    J. G. INGRES    2,341,502
POWER STEERING MECHANISM
Filed Sept. 26, 1941    3 Sheets-Sheet 3
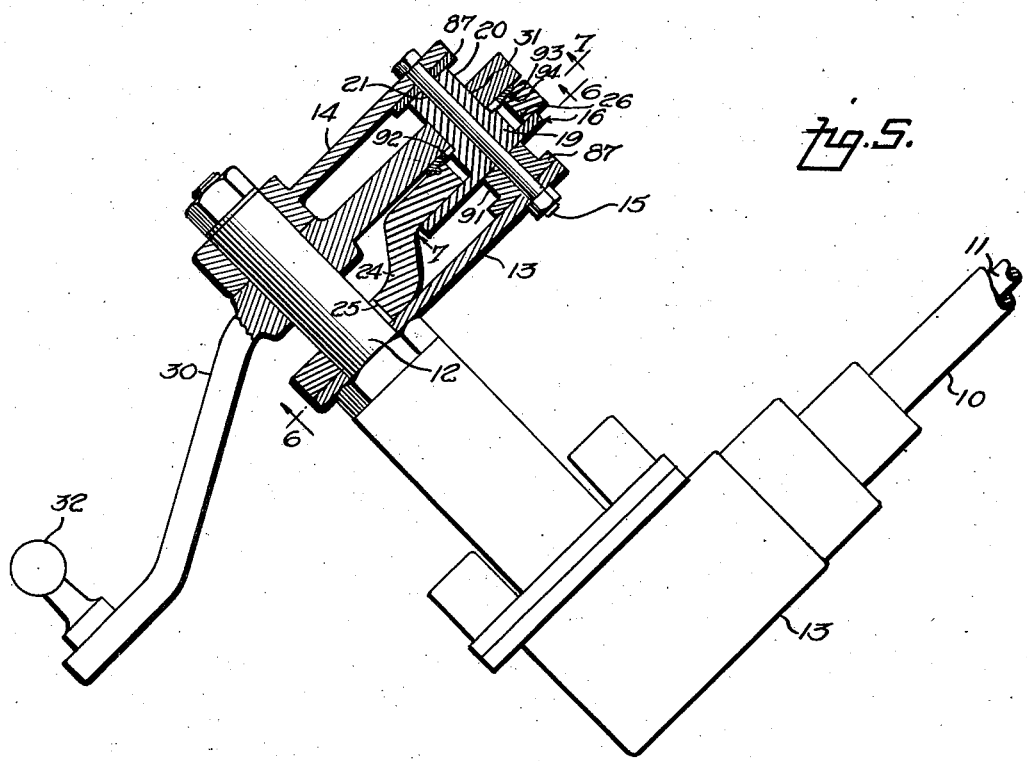
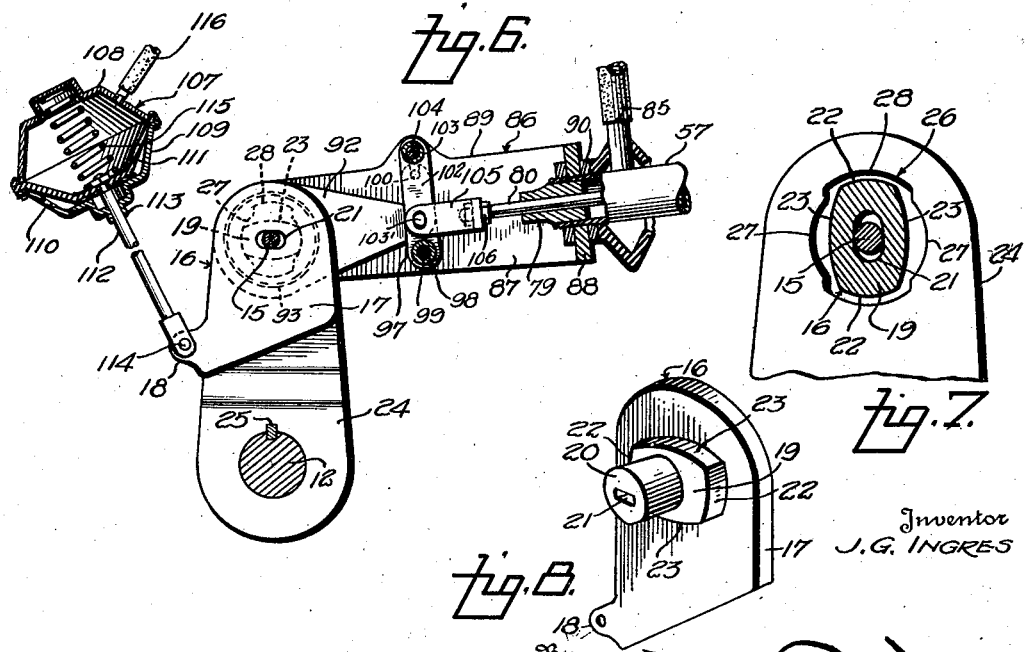
Inventor
J. G. INGRES Patented Feb. 8, 1944

2,341,502

UNITED STATES PATENT OFFICE 2,341,502

POWER STEERING MECHANISM

Jeannot G. Ingres, Detroit, Mich., assignor to Automatic Shifters, Inc., Richmond, Va., a corporation of Virginia Application September 26, 1941, Serial No. 412,505

35 Claims. (Cl. 180—79.2)

This invention relates to power steering mechanisms for motor vehicles, and is an improvement over the structure shown in the copending application of George Tucker Smith, Serial No. 380,563, filed February 25, 1941.

The gear ratio provided between the steering wheel and the dirigible front wheels of a motor vehicle is such as to permit relatively easy steering under most conditions, but is such that it requires excessive force to turn the front wheels of the vehicle when the vehicle is traveling slowly or is at a standstill. Little effort is required to steer when the vehicle is traveling at a reasonable speed, but if a sufficiently high gear ratio were provided to permit easy steering when the vehicle is traveling slowly or is stationary, it would be necessary to substantially rotate the steering wheel for every relatively slight turn and this would be highly disadvantageous at normal vehicle speeds.

In the copending application referred to there is disclosed and claimed a novel type of steering mechanism wherein power means is provided for eliminating the necessity for using great physical effort to turn the front wheels of the vehicle when the vehicle is at rest or traveling slowly but wherein the power means is inoperative at predetermined vehicle speeds when the use of power is unnecessary. The prior construction referred to employs a differential fluid pressure motor as the power source and this motor is controlled by a follow-up value mechanism one element of which is manually operated upon the turning of the steering wheel and the other of which is operated by the motor to cause the pressure responsive member thereof to move to an extent proportional to turning movement of the steering wheel. The motor is always operated through the follow-up valve mechanism whenever the steering wheel is turned, but the motor is effective for power-steering the vehicle only under the conditions in which power steering is desired, this being provided by the use of means which directly connects the steering mechanism to the drag link or other corresponding element when manual steering is desired with the motor following up without delivering power, the functioning of the motor for power steering being provided by disconnecting the positive manual connection and directly connecting the motor to the element to be operated.

Under such conditions, the change over from power to manual steering and vice versa is capable of taking place at any time regardless of any conditions, and the constant operation of the motor, regardless of whether it is delivering its power, eliminates any necessity for the driver's having to move the elements of the motor when manual steering is taking place. The change over in the prior construction from manual to power steering is accomplished by the use of a slidable element adapted in one position to provide manual drive referred to, and adapted in its other position to provide the necessary connection with the motor to utilize the latter for power steering.

An important object of the present invention is to provide the mechanism adapted for performing the same functions as the prior construction referred to but wherein an improved construction is employed particularly with relation to the means for changing over between manual and power steering.

A further object is to provide a novel combination of elements including a device mounted to rock on a pivot axis to change over between manual and power steering, as distinguished from the slidable device of the prior construction referred to which is provided with tapered engaging faces which possibly might wedge together and stick in one position or the other.

A further object is to provide a power or manual steering mechanism wherein a rocking device is provided for determining whether steering shall take place manually or by the power of a differential fluid pressure motor and wherein a follow-up valve mechanism controls operation of the motor and is operated regardless of whether the mechanism is being used for manual or power steering, thus causing the motor to operate regardless of whether it is delivering power, thus eliminating the necessity for the driver's having to move the power mechanism when steering manually.

Other objects and advantages of the invention will become apparent during the course of the following description.

Figure 9:
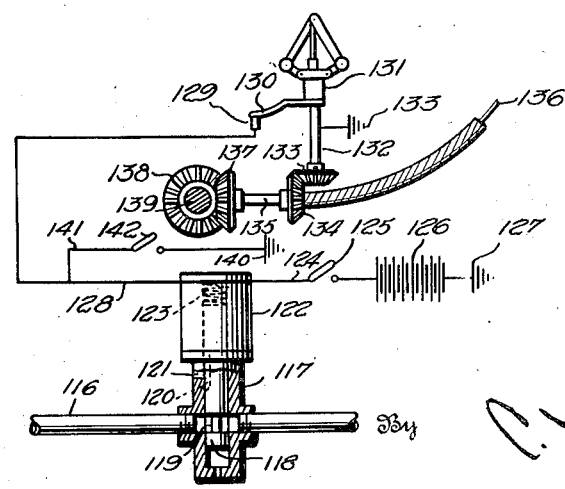

In the drawings I have shown one embodiment of the invention. In this showing:

Figure 1 is a perspective view of a portion of a vehicle steering mechanism,

Figure 2 is a central axial sectional view through the motor and associated elements, Figure 3 is a detail sectional view on line 3—3 of Figure 2, Figure 4 is a fragmentary detail perspective view of portions of the valve operating mechanism, the parts being shown separated, Figure 5 is a side elevation of a portion of the steering mechanism showing parts of the invention applied, certain of the latter elements being broken away and shown in section, Figure 6 is a fragmentary sectional view on line 6—6 of Figure 5, Figure 7 is a similar view on line 7—7 of Figure 5, Figure 8 is a detail perspective view of the cam device, and, Figure 9 is a diagrammatic view showing one form of electrical control means for the device.

Referring to Figure 1 the numeral 10 designates a steering column in which is arranged the usual steering post 11 (Figure 5). The upper end of the steering post carries the usual steering wheel 12' and the lower end of the steering column extends into a housing 13' in which is arranged the usual reduction gearing (not shown) to transmit movement from the steering post 11 to a shaft 12. This shaft, in modern motor vehicles, carries means in the form of a lever for transmitting movement to the front wheels of a motor vehicle, but this lever is altered and is controlled in a different manner in the present invention, as will become apparent.

The shaft 12 is provided with a pair of spaced brackets 13 and 14, rotatable relative to the shaft, and carrying a smaller shaft 15 at their free ends, as shown in Figure 5. The shaft 15 carries a cam device indicated as a whole by the numeral 16 and shown in perspective in Figure 8. The cam device comprises a plate 17 having a projecting lip 18 for a purpose to be described. A cam 19 is formed integral with or suitably secured to the plate 17 and a tubular extension 20 is carried by the cam 19. The extension 20 likewise may be integral with the element 17 and 19. The cam device 16 is provided therethrough with an opening 21 through which the shaft 15 extends, this shaft being approximately equal in width to the slot 21 and thus fixed against lateral movement with respect to the slot, while the slot permits the cam device as a whole to partake of some relative movement with respect to the shaft 15 in a direction lengthwise of the slot 21. The cam 19 is provided with opposite arcuate surfaces 22, concentric with the extension 20, and is also provided with intervening more slightly curved faces 23. The latter faces are without function, while the purpose of the faces 22 will be referred to later.

An arm 24 is keyed to the shaft 12 as at 25 and accordingly will be turned whenever the shaft 12 is turned upon movement of the steering wheel. At its end, the arm 24 is provided with an opening indicated as a whole by the numeral 26. This opening is provided with opposite arcuate surfaces 27 concentric with and of the same diameter as the surfaces 22 of the cam 19. Between the surfaces 27 the arm 24 is provided with intervening arcuate surfaces 28 which may be concentric with the surfaces 27, but in any event are so arranged that they will not contact with the faces 22 when the cam 19 is in the position shown in Figure 7. With the parts in the position shown in Figure 7 it will be apparent that the arm 24 is free to partake of limited movement about its turning axis independently of the cam 19, the length of the surface 28 being such as to permit this independent movement to take place.

A steering lever 30 is journalled on the shaft 12 and is provided at its upper end (Figure 5) with an opening 31 receiving the sleeve 20. The lower end of the lever 30 is provided with a ball 32 receivable in a socket forming a part of the conventional means for turning the front wheels of a motor vehicle. The lever 30 takes the place of the usual arm fixed to the shaft 12 and operating through the usual conventional connections (not shown) to the front wheels. Inasmuch as the means for connecting the ball 32 to the front wheels is conventional, as stated, it is unnecessary that such means be illustrated, and for the purpose of the appended claims the ball 32 may be considered the dirigible wheel "steering connection." It will be apparent that manual movement of the arm 24 will transmit movement to the cam 19, when the latter is turned at right angles from its position in Figure 7, and under such conditions the sleeve 20 will transmit manual force through the lever 30 to operate the steering connections.

Power means is provided for operating the sleeve 20 and hence the lever 30 when the cam 19 is in the position shown in Figure 7. The power means employed is preferably in the form of a vacuum motor indicated as a whole by numeral 33 (Figures 1 and 2). This motor comprises a pair of casing sections 34 and 35 the latter of which may be provided with a stud 36 extending through deformable washers 37 and through an outer metal washer 38, this device providing resilient means for mounting the motor on the upper end of a bracket 39 supported at any suitable point on the motor vehicle. The resilient mounting is provided, as will become apparent, to permit the motor to partake of limited bodily swinging movement during its operation.

A pressure responsive unit indicated as a whole by the numeral 40 is arranged in the motor. This unit comprises a pair of diaphragms 41 and 42 having outer peripheral portions 43 arranged respectively against annular flanges 44 formed on the ends of the casing sections 34 and 35, as shown in Figure 2. Between the peripheral portions of the diaphragms is arranged an annular filler ring 45 having radial apertures 46 affording communication between the atmosphere and the space between the diaphragms 41 and 42. It will be noted that each diaphragm is buckled into its corresponding casing section 34 or 35. This arrangement and the apertured ring 45 form no part of the present invention per se but are part of the subject matter of my copending application Serial No. 410,940, filed September 15, 1941.

The pressure responsive unit further comprises a preferably die-cast body 47 having an annular flange portion 48 adjacent which is mounted a cap member 49, and a flexible diaphragm 50 is arranged between the flange 48 and cap 49. The flange 48 and cap 49 are respectively chambered as at 51 and 52 and the diaphragm 50 is subjected to pressures in these chambers in a manner and for a purpose to be described. The inner peripheral edges 53 of the diaphragms 41 and 42 are arranged respectively against the flange 48 and cap 49 and clamping rings 54 are arranged against the peripheral diaphragm portions 53, while bolts 55 serve to clamp together as a unit the peripheral portions of the diaphragms 41, 42 and 50 and the flange 48 and cap 49.

The body 47 includes an integral axial extension 56 receiving the inner end of a tubular piston rod 57 and a valve 58 is slidable in the portion of the tubular piston rod within the body 47 as shown in Figure 2. One end of the valve 58 projects into the chamber 51 to be connected to the diaphragm 50 as at 59.

The valve 58 is provided with an elongated annular groove 60 in constant communication with a passage 61 in the extension 56, and the passage 61 is open at all times to the atmosphere in a manner to be described. The valve is also provided with an annular vacuum groove 62 communicating through radial ports 63 with an axial recess 64 formed in the valve 58. This recess, and the space 65 to the left of the valve 58 as viewed in Figure 2, are in constant communication with a source of partial vacuum, as will be described. Upon movement of the valve 58 to the right as viewed in Figure 2 the vacuum space 65 will be opened to a passage 66 communicating with the interior of the casing section 35, and the passage 66 communicates with the chamber 51 through a port 67. At the same time, such movement of the valve will establish communication between the groove 60 and a passage 68, communicating as at 69 with the interior of the casing section 34 and with the chamber 52 through a port 70.

It will be apparent that a reversal of the movement of the valve will connect the atmospheric groove 60 to the passage 66, and will connect the vacuum groove 62 to the passage 68 to reversely operate the motor. Under all conditions the space between the diaphragms 41 and 42 will remain in communication with the atmosphere as one source of pressure fluid, while operation of the valve in either direction will connect one of the casing sections 34 or 35 to a source of partial vacuum while connecting the other casing section to the atmosphere. Pressures will always be balanced on opposite sides of one of the diaphragms 41 or 42, while the generation of differential pressures on opposite sides of the other diaphragm will always urge such diaphragm in the direction in which it extends into its associated motor casing section.

A tubular sleeve 71 forms in effect an extension of the casing section 34. This extension is connected to the casing section 34 by a relatively thick rubber or similar annular plate 72, clamped to the extension 71 and to the casing section 34 by suitable clamping flanges 73. The purpose of this arrangement is to provide sound deadening means to render the operation of the mechanism quieter, as is desirable in many installations. The sleeve 71 is provided with a reduced axial extension 74 in which is arranged a bearing 75 slidably receiving the tubular piston rod 57.

A sleeve 76 is arranged concentrically within and spaced from the tubular piston rod 57, thus forming an annular space 77 between the elements 57 and 76. This space is closed at its ends by heads 78 and 79 carried by the respective ends of the sleeve 76. The tubular piston rod 57 is provided with an air port 78, as shown in Figure 2.

The left hand end of the tubular piston rod 57 is closed by a plug 79 forming a bearing slidably receiving a valve operating rod 80. This rod extends axially through the sleeve 76 and into the axial recess 64 and is pinned as at 81 to the valve 58. The rod 80 is smaller than the internal diameter of the sleeve 76, thus providing a space 82 communicating with the space 65 and with the axial recess 64. The outer end of the space 82 communicates with a space 83 between the plug 79 and the adjacent end of the sleeve 76, and the space 83 communicates through a nipple 84 with a flexible hose 85 leading to a source of partial vacuum such as the intake manifold of a motor vehicle engine.

A substantially U-shaped yoke indicated as a whole by the numeral 86 is provided with opposite parallel walls 87 connected at one end by a transverse wall 88. The latter wall has an opening receiving the adjacent end of the tubular piston rod 57 which is threaded to receive nuts 89 and 90 for clamping the tubular piston rod rigidly with respect to the yoke 86. The ends of the side members 87 of the yoke 86 are apertured to receive the shaft 15 (Figure 5) and one of these arms is surrounded by a filler sleeve 91 to take up the space between such arm 87 and the cam member 16. It will be apparent that energization of the motor delivers power to the tubular piston rod 57 and yoke 86 and thus through the arms 87 of the latter to the shaft 15, thus actuating the sleeve 20 and lever 30.

Means is provided for operating the valve mechanism of the motor upon manual operation of the arm 24 (Figure 5) and for a reason which will be explained, this valve mechanism is always operated regardless of whether manual or power operation for the device to be operated is desired. In this connection it is pointed out that the present mechanism, while capable of use wherever a fluid pressure motor of the type referred to can be used, is particularly intended for operating a steering mechanism of a motor vehicle and in such use extremely fast response of the motor to the turning of the steering wheel is desired. The valve operating mechanism of the present device, as will become apparent, provides for extremely rapid response of the motor, and accordingly turning movement of the front wheels of the vehicle, under power operating conditions would take place substantially instantaneously upon turning movement of the steering wheel.

Referring to Figures 2, 5 and 6, the numeral 92 designates a plate having one end enlarged and substantially circular and apertured to receive the sleeve 20 of the cam device 16. Such enlarged end of the plate 92 is provided with a laterally extending flange 93 which is annular and is received in a similarly shaped groove 94 formed in the lever 24. Thus the plate 92 is free to turn with respect to the arm 24 about the axis of the shaft 15, but movement of the free end of the arm 24 laterally with respect to the shaft 15 will bodily move the plate 92 and such movement takes place from right to left as viewed in Figures 2 and 6.

Referring to Figures 3 and 4 it will be noted that the smaller end of the plate 92 carries a bearing 95 receiving a trunnion 96 carried by a lever 97. This lever is provided at its lower end with a preferably integral sleeve 98 mounted to rock on a shaft 99 having its ends mounted in the arms 87 of the yoke 86. The upper end of the lever 97 is provided with a slot 100 receiving a trunnion 101 carried by a second lever 102 having a sleeve 103 at its upper end, similar to the sleeve 98, and receiving a shaft 104 also having its ends mounted in the yoke arms 97. The lower end of the lever 102 carries a trunnion 103' engageable in an opening 104' carried by an arm 105 secured to the end of the valve operating rod 80 by means of nuts 106. The opening 104' is slightly elongated vertically to permit the lever 102 to swing about the axis of the shaft 104 while the valve rod 80 partakes of linear movement, as will be obvious.

The cam device 16 has the ear 18 thereof provided with means for turning the cam device to an angle of 90 degrees to provide for either manual or power steering. The turning of the cam device, so far as the present invention is concerned, does not depend on any power means for turning it in the manner stated but it is preferred that it be turned automatically in accordance with changes in vehicle speed. To this end, Figure 6 discloses the provision of a small auxiliary vacuum motor 107 for operating the cam device 16. This motor comprises upper and lower casing sections 108 and 109 the latter of which is vented to the atmosphere as at 110. A diaphragm 111 has its periphery clamped between the peripheral portions of the casing sections 108 and 109 and connected centrally to a rod 112 operating in a bearing 113 and connected at its lower end as at 114 to the ear 18. Any suitable means (not shown) may be employed for supporting the motor 107 to permit it to partake of the slight rocking movement necessary to provide for turning movement of the connection 114 about the axis of the shaft 15. If desired, of course, the bearing 113 may be omitted by providing sufficient space for the rod 112 to pass through the casing section 109, whereby the flexibility of the diaphragm 111 will provide for turning movement of the pivot connection 114.

It will be obvious that atmospheric pressure is always present in the casing section 109 and a spring 115 is arranged in the casing section 108 to normally project the diaphragm 111 downwardly to turn the cam device 16 to a manual-steering position. A vacuum pipe 116 communicates with the interior of the upper casing section 108 and is connected to a suitable source of vacuum such as the intake manifold of the motor vehicle engine.

Means are provided for controlling the auxiliary motor 107 to provide whatever results are desired, namely, complete manual steering under all conditions, complete power steering under all conditions, or power steering below a predetermined vehicle speed with manual steering automatically provided above such speed. Referring to Figure 9 it will be noted that the line 116 extends through a valve casing 117 in which is arranged a slidable valve 118 circumferentially grooved as at 119 so that when the valve is in the position shown in Figure 9 the line 116 is opened to the source of vacuum. The valve is adapted to drop to an inoperative position with the bottom of the valve contacting the bottom of the casing 117, in which position a groove 120 in the valve communicates at one end with the atmosphere through a port 121 and communicates at its other end with the end of the line 116 extending to the motor 107.

It will be apparent therefore that when the valve 118 is in the position shown in Figure 9, the motor casing 108 is open to the atmosphere and the spring 115 will hold the cam device 16 in the manual-steering position. The valve 118 has its upper end forming the armature of a solenoid winding 122 and while the solenoid is in a vertical position so that its armature is biased downwardly by gravity, a small spring 123 may be employed to positively move the valve 118 to its lower position. One terminal of the solenoid winding 122 is connected by a wire 124 to a manual switch 125 thence to one terminal of the source 126. This source may be the battery of a motor vehicle and the other side of the source is grounded in accordance with conventional practice as at 127.

The other terminal of the solenoid winding 122 is connected by a wire 128 to a contact 129 engageable by a switch 130 carried by a speed governor 131, which may be of any conventional type. This governor is driven by a shaft 132 shown as being grounded as at 133. If desired, the shaft 132 may be driven by a bevel gear 133 meshing with a bevel gear 134 carried by a speedometer drive shaft 135 from which a flexible drive shaft 136 leads to the speedometer. The shaft 135 carries a bevel gear 137 meshing with a bevel gear 138 carried by a shaft 139 which may be the propeller shaft or any other driven shaft of the vehicle.

In order to render the solenoid winding energizable independently of vehicle speed, the wire 128 is connected to a ground 140 independently of the governor switch, through a shunt wire 141 controlled by a manual switch 142.

The operation of the apparatus is as follows:

The change-over mechanism is biased for manual steering, and such operation will be considered first. Assuming that the valve 118 is in its lower position, the upper casing section 108 (Figure 6) will be vented to the atmosphere through the groove 120 and port 121 (Figure 9) and accordingly the diaphragm 111 of the auxiliary motor will be in its lower position with the cam 19 in the dotted line position shown in Figure 6. Under such conditions any turning movement of the steering arm 24 will be directly transmitted to the cam member 19 to move this member bodily. At the same time, it will be apparent that when such movement is transmitted to the cam 19, the latter element is free to move with respect to the shaft 15 since the slot 21 will be horizontally arranged as viewed in Figure 6.

Turning movement of the steering wheel 12' under such conditions will turn the arm 24 (Figures 5 and 6) and the free end of this arm will transmit movement to the cam 19, the sleeve 20 of which is circular and fits in circular opening 31 (Figure 5) in the upper end of the lever 30. This lever therefore will be manually turned upon turning movement of the arm 24, the cam 19 and its sleeve 20 serving to lock the free end of the arm 24 and the upper end of the lever 30 together for bodily movement, these elements turning about the axis of the steering shaft 12 (Figure 5).

As previously stated, movement of the arm 16 is free to take place independently of the shaft 15 for the reason that the slot 21 is perpendicular to the arm 24. This arrangement provides lost motion between the cam device 16 and the arms 87 of the yoke 86, and accordingly there will be no mechanical driving connection between the motor 33 and the cam device 16. The cam operated plate 92, however, has no lost motion with respect to the arm 24 due to the arrangement of the flange 93 in the slot 94. Upon manual turning movement of the arm 24, therefore, the plate 92 will move the valve operating rod 80 (Figures 2 and 6) to energize the motor 33. Since it will be obvious that any movement of the arm 24 will operate the valve mechanism, the motor will be energized upon any turning movement of the steering wheel, regardless of whether manual or power steering takes place. The motor is therefore caused to follow up with respect to the valve mechanism, as will be further described, but the motor will deliver no power to the steering lever 30 because of the lost motion provided by the slot 21. This arrangement is advantageous since it permits manual steering to take place without the operator having to overcome the friction of the motor parts in manually steering the vehicle. The functioning of the valve mechanism will be described in connection with the power steering operation. It will become apparent that the pressure responsive unit of the motor 33 follows up in either direction of turning movement of the steering wheel 12', and consequently in either direction of movement of the valve 58, and accordingly the motor will be energized to move in accordance with every manual steering operation without delivering any power.

Power operation of the steering mechanism will take place when the valve 118 (Figure 9) is in the position shown in Figure 9 in which case communication will be established between the motor casing 108 (Figure 6) and the source of partial vacuum through the pipe 116 and valve groove 119. Under such conditions air will be exhausted from the motor casing 108 and atmospheric pressure beneath the diaphragm 111 will move the diaphragm 111 and rod 112 upwardly to turn the plate 17 in a clockwise direction through an angle of 90 degrees. The cam 19 will then assume the position shown in Figure 7 and it will be apparent that manual turning movement of the arm 24 can take place to a limited extent independently of and without transmitting movement to the cam 19. However, the cam device will be fixed against relative movement with respect to the shaft 15 in a direction transverse to the slot 21.

All of the parts will now be positioned for power steering. Turning movement of the steering wheel 12 will turn the steering arm 24 in the same manner as before and this arm will immediately transmit movement to the valve 58 (Figure 2) through the plate 92, levers 97 and 102 (Figures 3 and 4) and valve rod 80, and accordingly the motor will be energized to transmit movement through the tubular piston rod 57 and yoke 86 to the shaft 15 and thence to the cam device 16 and shaft 15 to turn the upper end of the lever 30 to steer the front vehicle wheels in accordance with the direction of movement of the steering wheel 12'. This operation will provide full power steering since the response of the motor is such that the shaft 15 (Figure 7) and the cam device 16 will be moved in the same direction as the arm 24 and accordingly the play between the opening 26 and cam 19 will not be taken up and no manual force therefore will be transmitted between the arm 24 and cam 19.

The valve operating plate 92 (Figures 2, 4 and 6) can be directly connected to the valve operating rod 80 and a wholly satisfactory operation will result. However, the mechanism for transmitting movement from the plate 92 to the rod 80 disclosed in Figures 2, 3 and 4 is highly advantageous for the reason that it provides for a substantially instantaneous response of the motor to turning movement of the steering wheel regardless of the amount of play which may exist between the plate 92 and the valve 58. Upon turning movement of the arm 24, the plate 92 will transmit movement to the pin 96 to turn the lever 97 and it will be obvious that the lever arm between the notch 100 (Figure 4) and the axis of the sleeve 98 is much longer than the lever arm between the pin 96 and the axis of the sleeve 98. Therefore the notch 100 (which engages the pin 101) will move this pin to a greater extent than movement is imparted to the plate 92 and pin 96.

Movement of the pin 101 turns the lever 102 about the axis of the sleeve 103, whereupon the pin 103' operates the arm 105 to actuate the arm 80. The lever arm between the pin 103' and the axis of the sleeve 103 is much longer than the lever arm between such axis and the pin 101. The lever arrangement therefore multiplies movement of the pin 101 in transmitting movement to the valve operating rod 80. The lever arrangement referred to provides a very fast operation of the valve 58 with respect to the speed of movement of the plate 92, and in actual practice a ratio of at least 12 to 1 in the movement of the valve with respect to movement of the plate 92 has been found advisable.

The lever arrangement referred to so greatly multiplies movement of the valve 58 as to render it unnecessary to accurately fit the valve operating parts in order to provide a fast operation of the motor and an immediate response of the motor to turning movement of the steering wheel. Instead of merely "cracking" the ports of the valve 58 upon turning movement of the steering wheel, such turning movement has the effect of immediately taking up all play in the valve operating parts and moving the valve promptly to a relatively widely open position whereby rapid admission of air to either end of the motor 33 and exhaustion of air from the other end thereof takes place, accompanied therefore by an immediate rapid response of the motor to turning movement of the steering wheel.

It will be obvious that the movement of the valve operating rod 80 will be in the same direction as movement of the plate 92 when the steering arm 24 is turned. Assuming that the plate 92 is moved to the right as viewed in Figure 2, the vacuum space 65 will be substantially widely opened to communication with the passage 66, thus exhausting air from the casing 35 and evacuating the chamber 51 to the same extent so far as pressure is concerned. At the same time, the valve groove 60 will be moved into communication with the passage 68 to connect the casing 34 and chamber 52 to the atmosphere. Under such conditions, atmospheric pressure will exist in the casing 34 and in the space between the diaphragms 41 and 42 (this space being in fixed communication with the atmosphere through ports 46), while reduced pressure will exist in the casing 35.

Equalized pressures therefore will exist on opposite sides of the diaphragm 41 and this element will remain inoperative and will project into the casing 34, while differential pressures will be established on opposite sides of the diaphragm 42, thus moving this diaphragm and consequently the pressure responsive unit as a whole toward the right as viewed in Figure 2. Movement of the valve 58 will be arrested when the operator ceases to turn the steering wheel. As previously stated, the lever mechanism shown in Figure 4 greatly increases the distance of movement of the valve 58 relative to movement of the plate 92 and it would be assumed at first glance that the pressure responsive unit 40 would have to move the same distance to follow up with respect to the valve and then stop when movement of the valve is arrested. This, of course, would provide an inoperative construction since obviously movement of the pressure responsive unit is accompanied by movement of the yoke 86 which is transmitted in turn to the shaft 15.

Referring to Figure 2 it will be obvious that initial turning movement of the steering wheel takes place with the shaft 104 and sleeve 103 stationary, and the lever mechanism referred to results in effecting rapid and substantial movement of the valve mechanism to effect immediate and substantial energization of the motor. This energization of the motor moves the pressure responsive member and this member in turn transmits movement through the tubular piston rod 57 to the yoke 86 and this movement obviously moves the turning axis of the shaft 104, thus tending to reverse the operation of the valve operating lever mechanism. Therefore, assuming that the plate 92 is moved one-half inch, a 12 to 1 ratio of the lever mechanism would theoretically move the valve 58 six inches, which, of course, would be impossible. What actually occurs is that rapid energization of the motor causes immediate response of the pressure movable member 40, and movement of this member, transmitted to the shaft 104, tends immediately to reverse operation of the lever mechanism which controls the valve.

Therefore, from an analysis of the operation bearing the foregoing in mind, it will be apparent that only the initial movement of the valve operating rod 80 takes place rapidly with respect to movement of the plate 92, thus providing immediate substantial energization of the motor 33. Thereafter the lever mechanism referred to moves substantially as a unit with the plate 92 and valve operating rod 80. When movement of the plate 92 is arrested, very slight additional movement of the pressure responsive unit 40 is necessary to restore the neutral position of the valve 58. Actually, therefore, the pressure responsive unit 40 will move exactly the same distance as the plate 92 but the nature of the lever mechanism is such as to provide far more rapid response of the motor than can be obtained with the use of conventional follow-up mechanisms.

It will be noted that the motor is preferably of the "vacuum suspension" type, the inner ends of the passages 66 and 68 being so arranged with respect to the left hand end of the valve 58 and with respect to the groove 62 that there is slight communication between these passages and the source of vacuum when the valve is in neutral position. This arrangement not only assists in rapid response of the motor to operation of the valve but also assists in arresting movement of the pressure responsive unit when it reaches a position corresponding to the position of the valve without any overrunning of the pressure responsive unit.

Operation of the motor for turning the front wheels of the vehicle in the opposite direction will be similar to that described. The valve 58 will be moved to the left as viewed in Figure 2 to connect the passage 66 to the atmospheric groove 60, while the vacuum groove 62 will be opened to communication with the passage 68 to exhaust air from the casing 34. Atmospheric pressure will then exist in the casing 35 and in the space between the two diaphragms, while reduced pressure will be established in the casing 34. Differential pressures on opposite sides of the diaphragm 41, therefore, will move the pressure responsive unit of the motor to the left, which, of course, is the same direction in which the valve 58 has been moved. When movement of the valve 58 is arrested, slight additional movement of the pressure responsive unit will restore the normal position of the ports 66 and 68 with respect to the valve, thereupon arresting further operation of the motor. The vacuum suspension feature is such that as the pressure responsive unit approaches neutral position with respect to the valve 58, the end of the motor which has been connected to the atmosphere will have limited communication with the source of partial vacuum just prior to the reaching of neutral position, thus exhausting air from the end of the motor which has been connected to the atmosphere before neutral position is reached. This tends to prevent overrunning of the pressure responsive unit with respect to the valve mechanism.

The rapid response of the motor to operation of the steering wheel is due largely to the lever mechanism shown in Figure 4, and the operation is assisted by the vacuum suspension feature, it having been found that a motor of this type responds more rapidly upon the dumping of air into one end of a vacuum suspended motor than is true when air is exhausted from one end of an air suspended motor. The instantaneous and substantial energization of the motor upon turning movement of the steering wheel is important for two reasons. In the first place, it is frequently necessary for an operator to make an emergency turn of the vehicle and it is vital that the dirigible wheels turn immediately upon movement of the steering wheel. The present construction provides such result. In the second place, the present construction is highly advantageous in use regardless of vehicle speeds since it tends strongly to prevent any movement of the front wheels except under the control of the steering wheel. In practice it has been found that there is no tendency in the present mechanism for the front wheels to be turned by ridges in a road or by holes in the roadway. Assuming that the steering wheel is held in a given position and the front wheels encounter a ridge or hole which tends to turn them, slight movement will be imparted to the valve operating mechanism through the lever 30, and a high transmission ratio between the plate 92 and the valve mechanism will result in energization of the motor to immediately buck the tendency of the front wheels of the vehicle to turn.

The provision of the cam device 16 and associated elements provides means whereby the change over between power and manual steering may be very quickly and easily provided. It is well known that rotational movements can be accomplished with much less effort than sliding movements due to the reduced friction encountered. The present device is therefore advantageous over the structure shown in the copending application of George Tucker Smith for this reason and for the additional reason that it eliminates any possibilty of the jamming of inclined surfaces, one against the other. The change over is accomplished merely by rotating the plate 17 at an angle of 90 degrees and this may be accomplished either manually or by the use of the auxiliary motor 107 (Figure 6) and this motor may be positively controlled in accordance with the system shown in Figure 9.

The controlling of the motor 107 is preferably accomplished in accordance with vehicle speeds. When the vehicle is stationary or traveling at a speed below a predetermined speed such as six to eight miles an hour, the switch arm 130 then engages the contact 129, thus completing a circuit from the battery 126 through wire 124 (the switch 125 being normally closed) through solenoid winding 122, wire 128, contact 129 and switch 130 and thence back to the source through grounds 133 and 127. Under such conditions the solenoid 122 will be energized and the vacuum line will be open to the source and the diaphragm 111 will be in its upper position. Therefore, the plate 17 will be turned in a clockwise direction 90 degrees from the position shown in Figure 6 and the cam 19 will be in the position shown in Figure 7 to provide power steering in the manner described. Above the predetermined speed referred to the circuit will be broken by movement of the switch 130, and the valve 118 will move to its lower position connecting the casing 108 of the auxiliary motor to the atmosphere thus providing manual steering in the manner described.

Simple means may be provided so that power steering will take place under all conditions or so that manual steering will take place under all conditions. The circuit through the solenoid winding 132 may be shunted around the governor switch by closing the switch 142, in which case the solenoid winding 122 will remain energized at all times, thus providing power steering regardless of any operating conditions. On the other hand, power steering may be completely locked out by opening the switch 125, under which conditions the solenoid winding can never be energized and the valve 118 will remain in its lower position. Thus it will be apparent that manual steering may be provided under all conditions if desired.

As previously stated, the auxiliary motor 107 is biased for manual operation. Accordingly it will be apparent that if the parts of the mechanism are positioned for power steering and a break in the vacuum lines should occur, the spring 115 will immediately and automatically move the plate 17 to the manual steering position. The vacuum line 116 is preferably in communication with the source of vacuum by being tapped into the vacuum line 85 (Figure 2) adjacent the motor 33. Under such conditions, any failure in vacuum in the motor 33 necessarily will be accompanied by a failure of vacuum in the auxiliary motor 107, thus providing for the automatic change over to manual steering.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a steering mechanism for a motor vehicle having a steering wheel and a steering connection to the dirigible wheels of the vehicle, a power device, and means mounted to be selectively rocked between two positions, said means being operative in one of such positions solely for transmitting manual movements of the steering wheel to said steering connection and operative in the other of such positions solely for connecting said power device thereto.

2. In a steering mechanism for a motor vehicle having a steering wheel and a steering connection to the dirigible wheels of the vehicle, a power device, and a cam device rotatable between two positions, said cam device being constructed and arranged to provide in one of its positions lost motion between said power device and said steering connection and a positive connection between the steering wheel and said steering connection, and to provide in the other of its positions lost motion between the steering wheel and said steering connection and a positive connection between said power device and said steering connection.

3. In a steering mechanism for a motor vehicle having a steering wheel and a steering connection to the dirigible wheels of the vehicle, a power device, means mounted to be selectively rocked between two positions, said means being operative in one of such positions solely for transmitting manual movements of the steering wheel to said steering connection and operative in the other of such positions solely for connecting said power device thereto, and a control mechanism for said power device operable upon any turning movement of the steering wheel.

4. In a steering mechanism for a motor vehicle having a steering wheel and a steering connection to the dirigible wheels of the vehicle, a power device, a cam device rotatable between two positions, said cam device being constructed and arranged to provide in one of its positions lost motion between said power device and said steering connection and a positive connection between the steering wheel and said steering connection, and to provide in the other of its positions lost motion between the steering wheel and said steering connection and a positive connection between said power device and said steering connection, and a control mechanism for said power device operable upon turning movement of the steering wheel in either position of said cam device.

5. In a steering mechanism for a motor vehicle having a steering wheel and a steering connection to the dirigible wheels of the vehicle, a differential fluid pressure motor, and means constructed and arranged to be selectively rotated between two positions, said means being operable in one of such positions solely for establishing motion transmitting connection between the steering wheel and said steering connection and operative in the other of such positions solely for establishing motion transmitting connection between said motor and said steering connection.

6. In a steering mechanism for a motor vehicle having a steering wheel and a steering connection to the dirigible wheels of the vehicle, a differential fluid pressure motor, means constructed and arranged to be selectively rotated between two positions, said means being operable in one of such positions solely for establishing motion transmitting connection between the steering wheel and said steering connection and operative in the other of such positions solely for establishing motion transmitting connection between said motor and said steering connection, and a control valve mechanism for said motor having mechanical connections operable by the steering wheel upon any turning movement thereof.

7. In a steering mechanism for a motor vehicle having a steering wheel and a steering connection to the dirigible wheels of the vehicle, a differential fluid pressure motor, and motion transmitting mechanism comprising a rotatable cam device selectively movable to two positions, said cam device being operable in one position solely for transmitting manual movements of the steering wheel to said steering connection and operable in its other position solely for transmitting power from said motor to said steering connection.

8. In a steering mechanism for a motor vehicle having a steering wheel and a steering connection to the dirigible wheels of the vehicle, a differential fluid pressure motor, motion transmitting mechanism comprising a rotatable cam device selectively movable to two positions, said cam device being operable in one position solely for transmitting manual movements of the steering wheel to said steering connection and operable in its other position solely for transmitting power from said motor to said steering connection, and a control valve mechanism for said motor operable by said steering wheel in either position of said cam device.

9. In a steering mechanism for a motor vehicle having a steering wheel and a steering connection to the dirigible wheels of the vehicle, a differential fluid pressure motor, motion transmitting mechanism comprising a device rotatable between two selective positions, said device being operable in one of said positions solely for transmitting movements of the steering wheel to said steering connection and operable in the other of said positions solely for transmitting motion from said motor to said steering connection, and a follow-up control valve mechanism for said motor having mechanical connection with the steering wheel to be operated thereby in any movement thereof.

10. In a steering mechanism for a motor vehicle having a steering wheel and a steering connection to the dirigible wheels of the vehicle, a differential fluid pressure motor, motion transmitting means comprising a cam device rotatable between two positions, said cam device being constructed and arranged to provide motion transmiting connection solely between the steering wheel and said steering connection when in one position and to provide a positive motion transmitting connection solely between said motor and said steering connection in its other position, and a follow-up control valve mechanism for said motor operable by the steering wheel in either position of said cam device.

11. In a steering mechanism for a motor vehicle having a steering wheel and a steering connection to the dirigible wheels of the vehicle, a differential fluid pressure motor, motion transmitting mechanism comprising a device rotatable between two selective positions, said device being operable in said positions solely for mechanically connecting the steering wheel to said steering connection and operable in the other of said positions solely for transmitting motion from said motor to said steering connection, a follow-up control valve mechanism for said motor, and manually operable means for actuating said valve mechanism upon any turning movement of the steering wheel, said manually operable means being constructed and arranged to provide movement of said valve mechanism at a relatively greater speed than the speed of turning movement of the steering wheel.

12. In a steering mechanism for a motor vehicle having a steering wheel and a steering connection to the dirigible wheels of the vehicle, a differential fluid pressure motor, motion transmitting means comprising a cam device rotatable between two positions, said cam device being constructed and arranged to provide motion transmitting connection solely between the steering wheel and said steering connection when in one position and to provide a positive motion transmitting connection solely between said motor and said steering connection in its other position, a follow-up control valve mechanism for said motor, and manually operable means for actuating said valve mechanism upon any turning movement of the steering wheel, said manually operable means being constructed and arranged to provide movement of said valve mechanism at a relatively greater speed than the speed of turning movement of the steering wheel.

13. In a steering mechanism for a motor vehicle having a steering wheel and a steering connection to the dirigible wheels of the vehicle, a power device having mechanical connection with said steering connection, and control mechanism for said power device operatively connected to the steering wheel to be actuated thereby, said control mechanism being constructed and arranged to provide relatively great initial energization of said power device upon initial relatively slight turning movement of the steering wheel.

14. In a steering mechanism for a motor vehicle having a steering wheel and a steering connection to the dirigible wheels of the vehicle, a power device having mechanical connection with said steering connection, and a follow-up control mechanism for said power device operable by the steering wheel and by the power device to cause the latter to partake of a follow-up action with respect to turning movement of the steering wheel, said control mechanism being constructed and arranged to effect a relatively great initial energization of said power device upon initial relatively slight turning movement of the steering wheel.

15. In a steering mechanism for a motor vehicle having a steering wheel and a steering connection to the dirigible wheels of the vehicle, a power device having mechanical connection with said steering connection, and control mechanism for said power device operatively connected to the steering wheel to be actuated thereby, said control mechanism being constructed and arranged to provide relatively great initial energization of said power device upon initial relatively slight turning movement of the steering wheel, said power device having an operative connection with said control mechanism to reduce the effectiveness of the latter for energizing said power device after the latter has been initially energized.

16. In a steering mechanism for a motor vehicle having a steering wheel and a steering connection to the dirigible wheels of the vehicle, a power device having mechanical connection with said steering connection, and a follow-up control mechanism for said power device operable by the steering wheel and by the power device to cause the latter to partake of a follow-up action with respect to turning movement of the steering wheel, said control mechanism being constructed and arranged to effect a relatively great initial energization of said power device upon initial relatively slight turning movement of the steering wheel, said power device having an operative connection with said control mechanism to reduce the effectiveness of the latter for energizing said power device after the latter has been initially energized.

17. In a steering mechanism for a motor vehicle having a steering wheel and a steering connection to the dirigible wheels of the vehicle, a differential fluid pressure motor having mechanical connection with said steering connection, a control valve mechanism for said motor, and operating connections between the steering wheel and said valve mechanism constructed and arranged to establish relatively great initial differential pressures in said motor upon initial relatively slight turning movement of the steering wheel.

18. In a steering mechanism for a motor vehicle having a steering wheel and a steering connection to the dirigible wheels of the vehicle, a differential fluid pressure motor having mechanical connection with said steering connection, a follow-up control valve mechanism for said motor having a pair of elements one operable in accordance with operation of the motor, and operating connections between the other element of the valve mechanism and the steering wheel, said operating connections being constructed and arranged to immediately establish relatively great initial differential pressures in said motor upon an initial relatively slight turning movement of the steering wheel.

19. In a steering mechanism for a motor vehicle having a steering wheel and a steering connection to the dirigible wheels of the vehicle, a differential fluid pressure motor having mechanical connection with said steering connection, a control valve mechanism for said motor, and operating connections between the steering wheel and said valve mechanism constructed and arranged to establish relatively great initial differential pressures in said motor upon initial relatively slight turning movement of the steering wheel, said motor having mechanical connection with said operating connections for reducing the effectiveness of said valve mechanism for maintaining relatively great differential pressures in said motor after initial energization thereof.

20. In a steering mechanism for a motor vehicle having a steering wheel and a steering connection to the dirigible wheels of the vehicle, a differential fluid pressure motor having mechanical connection with said steering connection, a follow-up control valve mechanism for said motor having a pair of elements one operable in accordance with operation of the motor, and operating connections between the other element of the valve mechanism and the steering wheel, said operating connections being constructed and arranged to immediately establish relatively great initial differential pressures in said motor upon an initial relatively slight turning movement of the steering wheel, said motor having mechanical connection with said operating connections for reducing the effectiveness of said valve mechanism for maintaining relatively great differential pressures in said motor after initial energization thereof.

21. In a steering mechanism for a motor vehicle having a steering wheel, a steering connection to the dirigible wheels of the vehicle comprising a lever, an arm mechanically connected to the steering wheel, a rotatable member connected to said lever and operable to transmit movement thereto, a power device, a motion transmitting connection operable thereby, said rotatable member being constructed and arranged to be turned to either of two positions to mechanically connect said rotatable member to said arm or to said motion transmitting connection, and means operable upon turning movement of the steering wheel for energizing said power device.

22. In a steering mechanism for a motor vehicle having a steering wheel, a steering connection to the dirigible wheels of the vehicle comprising a lever, an arm mechanically connected to the steering wheel, a rotatable member connected to said lever and operable to transmit movement thereto, a power device, a motion transmitting connection operable thereby, said rotatable member being constructed and arranged to be turned to either of two positions to mechanically connect said rotatable member to said arm or to said motion transmitting connection, and a follow-up control mechanism for said power device operable upon turning movement of the steering wheel.

23. In a steering mechanism for a motor vehicle having a steering wheel, a steering connection to the dirigible wheels of the vehicle comprising a lever, an arm mechanically connected to the steering wheel, a rotatable member connected to said lever and operable to transmit movement thereto, a differential fluid pressure motor, a motion transmitting connection operable thereby, said rotatable member being constructed and arranged to be turned to either of two positions to mechanically connect said rotatable member to said arm or to said motion transmitting connection, and a follow-up control valve mechanism for said motor operable upon turning movement of the steering wheel.

24. In a steering mechanism for a motor vehicle having a steering wheel, a steering connection to the dirigible wheels of the vehicle comprising a lever, an arm mechanically connected to the steering wheel, a rotatable member connected to said lever and operable to transmit movement thereto, a differential fluid pressure motor, a motion transmitting connection operable thereby, said rotatable member being constructed and arranged to be turned to either of two positions to mechanically connect said rotatable member to said arm or to said motion transmitting connection, and a follow-up control valve mechanism for said motor comprising a pair of elements one operable by the motor, and motion transmitting means for operating the other valve element upon turning movement of the steering wheel, said motion transmitting means being constructed and arranged to so operate said other valve element as to establish initial relatively high differential pressures in said motor upon initial relatively slight turning movement of the steering wheel.

25. In a steering mechanism for a motor vehicle having a steering wheel, a steering connection to the dirigible wheels of the vehicle comprising a lever, an arm mechanically connected to the steering wheel, a rotatable member connected to said lever and operable to transmit movement thereto, a differential fluid pressure motor, a motion transmitting connection operable thereby, said rotatable member being constructed and arranged to be turned to either of two positions to mechanically connect said rotatable member to said arm or to said motion transmitting connection, and a follow-up control valve mechanism for said motor comprising a pair of elements one operable by the motor, and motion transmitting means for operating the other valve element upon turning movement of the steering wheel, said motion transmitting means being constructed and arranged to so operate said other valve element as to establish initial relatively high differential pressures in said motor upon initial relatively slight turning movement of the steering wheel, said motor having mechanical connection with said motion transmitting means for reducing the effectiveness of the latter for maintaining relatively high differential pressures in said motor after initial energization thereof.

26. In a steering mechanism for a motor vehicle having a steering wheel normally arranged in a straight-away steering position, and a steering connection to the dirigible wheels of the vehicle, a power device connected to the steering connection, a control mechanism for said power device having a control element normally occupying a position in which said power device is deenergized and relatively movable from such position to effect energization of the power device, said control mechanism being so constructed and arranged that the greater the relative movement of said control element from its normal position the greater will be the degree of energization of said power device, and motion transmitting means for moving said control element upon turning movement of the steering wheel wholly independently of said steering connection, said motion transmitting means being constructed and arranged to effect movement of said control element away from its normal position to an extent proportionately greater than an initial turning movement of the steering wheel.

27. Apparatus constructed in accordance with claim 26 wherein said power device is provided with an element operatively related to said motion transmitting means to cause the latter to at least partially return said control element to its normal position after said power device has been initially energized.

28. In a steering mechanism for a motor vehicle having a steering wheel normally arranged in a straight-away steering position, and a steering connection to the dirigible wheels of the vehicle, a differential fluid pressure motor connected to the steering connection, a control mechanism for said motor having a control valve normally occupying a position balancing pressures in said motor and relatively movable from such position to connect said motor to a source of pressure differential, said control mechanism being so constructed and arranged that the greater the relative movement of said valve from its normal position the greater will be the differential pressure established in said motor, and motion transmitting means for moving said valve upon turning movement of the steering wheel wholly independently of said steering connection, said motion transmitting means being constructed and arranged to effect movement of said valve away from its normal position to an extent proportionately greater than an initial turning movement of the steering wheel.

29. Apparatus constructed in accordance with claim 28 wherein said motor is provided with an element operatively related to said motion transmitting means to cause the latter to at least partially return said valve to its normal position after said motor has been initially energized.

30. In a steering mechanism for a motor vehicle having a steering wheel and a steering connection to the dirigible wheels of the vehicle, a motor having mechanical connection with said steering connection, follow-up control means for said motor having a pair of relatively movable elements, motion transmitting means for effecting relative movement of said elements, such means being arranged for establishing mechanical connection of the respective movable elements with the steering wheel and with the steering connection and so constructed and arranged that a given relative movement of the steering wheel and the steering connection will effect a greater relative movement of said pair of elements, and means constructed and arranged to be operative upon a motor-energizing relative movement of said elements for opposing such relative movement.

31. Apparatus constructed in accordance with claim 30 wherein said last named means comprises a fluid pressure responsive device connectible to a source of pressure differential upon a motor-energizing relative movement of said elements for opposing such relative movement.

32. In a steering mechanism for a motor vehicle having a steering wheel and a steering connection to the dirigible wheels of the vehicle, a differential fluid pressure motor having mechanical connection with said steering connection, a follow-up control valve mechanism for said motor having a pair of relatively movable valve elements, motion transmitting means for effecting relative movement of said valve elements, such means being arranged for establishing mechanical connection of the respective movable elements with the steering wheel and with the steering connection and so constructed and arranged that a given relative movement of the steering wheel and the steering connection will effect a greater relative movement of said pair of valve elements, and means constructed and arranged to be operative upon a motor-energizing relative movement of said valve elements for opposing such relative movement.

33. Apparatus constructed in accordance with claim 32 wherein said last named means comprises a fluid pressure responsive device subject to control by said valve elements.

34. In a steering mechanism for a motor vehicle having a steering wheel and a steering connection to the dirigible wheels of the vehicle, a differential fluid pressure motor having a pressure responsive member mechanically connected with said steering connection, a follow-up control valve mechanism for said motor having a pair of relatively movable valve elements, motion transmitting means for effecting relative movement of said valve elements and comprising a lever mechanism having mechanical connection with the steering wheel, with said pressure responsive member, and with one of said valve elements wholly independently of the steering connection and so constructed and arranged that a given relative movement between the steering wheel and said pressure responsive member will effect a greater movement of such valve element, and means constructed and arranged to be operative upon any motor-energizing relative movement of said valve elements for opposing such relative movement.

35. Apparatus constructed in accordance with claim 34 wherein said last named means comprises a fluid pressure responsive device subject to control by said valve elements.

JEANNOT G. INGRES.